United States Patent
Wang et al.

(10) Patent No.: US 12,266,274 B2
(45) Date of Patent: Apr. 1, 2025

(54) COUPLING DESIGN FOR ABDOMEN FLESH OF ANTHROPOMORPHIC TEST DEVICE

(71) Applicant: Humanetics Innovative Solutions, Inc., Farmington Hills, MI (US)

(72) Inventors: Zhenwen J. Wang, Farmington Hills, MI (US); Thanh Nghi, Ann Arbor, MI (US); Joseph P. McInnis, New Hudson, MI (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 1050 days.

(21) Appl. No.: 17/277,614

(22) PCT Filed: Sep. 23, 2019

(86) PCT No.: PCT/US2019/052429
§ 371 (c)(1),
(2) Date: Mar. 18, 2021

(87) PCT Pub. No.: WO2020/061568
PCT Pub. Date: Mar. 26, 2020

(65) Prior Publication Data
US 2021/0350726 A1    Nov. 11, 2021

Related U.S. Application Data

(60) Provisional application No. 62/734,582, filed on Sep. 21, 2018.

(51) Int. Cl.
*G09B 23/34* (2006.01)
*G09B 23/32* (2006.01)

(52) U.S. Cl.
CPC ............. *G09B 23/34* (2013.01); *G09B 23/32* (2013.01)

(58) Field of Classification Search
CPC ........ G09B 23/28; G09B 23/30; G09B 23/32; G09B 23/34
(Continued)

(56) References Cited

U.S. PATENT DOCUMENTS 2,750,670 A * 6/1956 Vigg .................... G09B 23/283
264/16
3,246,422 A     4/1966 Teagarden
(Continued)

FOREIGN PATENT DOCUMENTS

CN      203275061 U    11/2013
CN      105922966 A     9/2016
(Continued)

OTHER PUBLICATIONS

English language abstract for JP 2005-078568 A extracted from espacenet.com database on Jun. 29, 2022, 1 page.
(Continued)

*Primary Examiner* — Kurt Fernstrom
(74) *Attorney, Agent, or Firm* — Howard & Howard Attorneys PLLC

(57) ABSTRACT

An anthropomorphic test device includes an abdomen component, a base member, and a resilient flange coupled to and extending from the base member. The base member has opposing inner and outer surfaces and peripheral edge, with the inner surface defining a first cavity. The resilient flange includes opposing flange inner and outer surfaces and a connecting flange peripheral edge surface, with the flange inner surface defining a second cavity and with the second cavity extending from and open with the first cavity. The abdomen component is partially contained within the first and second cavity and coupled to the pelvis and resilient flange such that a first portion of an outer surface of the abdomen component is engaged with the inner surface of the
(Continued)

base member and such that a second portion of the outer surface of the abdomen component received is resiliently retained by the resilient flange.

18 Claims, 6 Drawing Sheets

(58) Field of Classification Search
USPC .......................................................... 434/267
See application file for complete search history.

(56) References Cited

U.S. PATENT DOCUMENTS

| | | | |
|---|---|---|---|
| 3,609,911 A | | 10/1971 | Hanf et al. |
| 3,755,920 A | * | 9/1973 | Smrcka ................. G09B 23/32 |
| | | | 434/274 |
| 4,536,165 A | | 8/1985 | Maar |
| 5,052,971 A | | 10/1991 | Young |
| 5,334,073 A | | 8/1994 | Tilbor et al. |
| 5,665,922 A | | 9/1997 | Tsukada et al. |
| 6,203,396 B1 | | 3/2001 | Asmussen et al. |
| 6,705,794 B2 | | 3/2004 | Varner et al. |
| 7,144,179 B2 | | 12/2006 | Varner et al. |
| 7,325,996 B2 | | 2/2008 | Varner et al. |
| 8,292,830 B2 | | 10/2012 | Bertocci |
| 8,684,783 B2 | | 4/2014 | Ehrsam |
| 9,205,798 B1 | | 12/2015 | Jindal et al. |
| 9,251,720 B2 | | 2/2016 | Ozawa |
| 9,398,820 B2 | | 7/2016 | Firestone et al. |
| 9,538,866 B2 | | 1/2017 | Atkinson et al. |
| 9,947,243 B1 | | 4/2018 | Isler et al. |
| 9,953,548 B2 | | 4/2018 | Fradette et al. |
| 10,182,671 B2 | | 1/2019 | Firestone et al. |
| 2004/0099825 A1 | * | 5/2004 | Huang ............... G01M 17/0078 |
| | | | 250/225 |
| 2004/0222249 A1 | | 11/2004 | Bentham et al. |
| 2005/0091017 A1 | * | 4/2005 | Namiki ................. G09B 23/28 |
| | | | 703/8 |
| 2010/0186477 A1 | * | 7/2010 | Barthelemy ........... B21D 15/03 |
| | | | 72/370.23 |
| 2011/0027767 A1 | | 2/2011 | Divinagracia |
| 2013/0000425 A1 | | 1/2013 | Arthur et al. |
| 2013/0186922 A1 | | 7/2013 | Soto Velasco |
| 2015/0165724 A1 | * | 6/2015 | Cox ......................... B32B 7/12 |
| | | | 156/196 |
| 2015/0198199 A1 | | 7/2015 | Wu |
| 2016/0372011 A1 | * | 12/2016 | Bernal .................. G09B 23/34 |
| 2017/0162077 A1 | | 6/2017 | Vara et al. |
| 2018/0136083 A1 | | 5/2018 | Wang et al. |
| 2018/0171601 A1 | | 6/2018 | Serrurier et al. |
| 2018/0330637 A1 | | 11/2018 | Jarratt |
| 2019/0180648 A1 | | 6/2019 | Tedeschi et al. |

FOREIGN PATENT DOCUMENTS

| | | |
|---|---|---|
| DE | 102015213589 A1 | 1/2017 |
| EP | 2305078 A1 | 4/2011 |
| FR | 2683320 A1 | 5/1993 |
| JP | 2005078568 A | 3/2005 |
| KR | 20090063433 A | 6/2009 |

OTHER PUBLICATIONS

International Search Report for Application No. PCT/US2019/052429 dated Nov. 19, 2019, 1 page.
English language abstract for FR 2 683 320 A1 extracted from espacenet.com database on Mar. 29, 2021, 1 page.
Chinese Search Report for Application CN 2019800676922 dated Oct. 7, 2023, 2 pages.
English language abstract for CN 105922966 A extracted from espacenet.com database on Oct. 18, 2023, 1 page.
English language abstract for CN 203275061 U extracted from espacenet.com database on Mar. 21, 2023, 1 page.
Machine-assisted English language abstract for DE 10 2015 213 589 A1 extracted from espacenet.com database on Mar. 21, 2023, 4 pages.
English language abstract for KR 2009-0063433 A extracted from espacenet.com database on Mar. 21, 2023, 1 page.
Chinese Search Report for Application CN 2019800676922 dated Feb. 27, 2023, 2 pages.

* cited by examiner

COUPLING DESIGN FOR ABDOMEN FLESH OF ANTHROPOMORPHIC TEST DEVICE

CROSS-REFERENCE TO RELATED APPLICATIONS

The present disclosure is the National Stage of International Patent Application PCT/US2019/052459, filed Sep. 23, 2019 which claims priority from U.S. Provisional App. Ser. No. 62/734,582, filed Sep. 21, 2018, the entirety of which is herein incorporated by reference.

BACKGROUND OF THE INVENTION

1. Field of the Invention

The present disclosure relates generally to anthropomorphic test devices and, more particularly, to a coupling design for abdomen flesh of an anthropomorphic test device.

2. Description of the Related Art

Automotive, aviation, and other vehicle manufacturers conduct a wide variety of collision testing to measure the effects of a collision on a vehicle and its occupants. Through collision testing, sometimes otherwise referred to as crash testing, a vehicle manufacturer gains valuable information that can be used to improve the vehicle.

Collision testing often involves the use of anthropomorphic test device, sometimes alternatively referred to as anthropomorphic mannequins, and better known as "crash test dummies", to estimate a human's injury risk. The crash test dummy typically includes a head assembly, spine assembly, rib cage assembly, pelvis assembly, right and left arm assemblies, and right and left leg assemblies. Joints are provided to couple various assemblies together and to allow articulation that simulates the human range of motion. In addition, these assemblies are typically covered with a simulated flesh that includes an inner foam material covered with a skin. The anthropomorphic test device must possess the general mechanical properties, masses, joints, and joint stiffness of the humans of interest. In addition, the anthropomorphic test device must possess sufficient mechanical impact response to cause them to interact with the vehicle's interior in a human-like manner during the collision testing.

Often times in these devices, the flesh is split at the joint to facilitate the assembly/disassembly and handling. However, while the split of the flesh facilitates assembly and handling, it created an unhuman-like response during collision testing. For example, in certain designs, separation problems exist between the abdomen component and base member (such as the pelvis member) flesh. During a collision test, a large offset, or separation, may be created in the flesh between the abdomen component and the base member corresponding to the abdomen and pelvis, resulting in improper flesh/mass coupling between the base member and abdomen component and resulting in a discontinuous surface along the skin of the associated flesh. This improper coupling and discontinuous surface may influence the dynamics of the abdomen and pelvis and contribute to the unhuman-like responses of the crash test dummy during this collision test, for example, the lap belt latches into the gap between the dummy's abdomen and the pelvis.

The present disclosure addresses and minimizes or overcomes the separation issues associated with the prior art designs and provides therefore a crash test dummy having a more human-like response during collision testing.

SUMMARY OF THE INVENTION

The present disclosure provides a coupling design for flesh of the anthropomorphic test device.

In particular, the anthropomorphic test device includes a base member having a base inner surface and an opposing base outer surface, with the base inner surface defining a first cavity. In addition, the test device also includes a resilient flange coupled to and extending from the base member with the resilient flange having a flange inner surface, an opposing flange outer surface and a flange peripheral edge with the flange inner surface defining a second cavity and with the second cavity extending from and open to the first cavity. Still further, the test device includes an abdomen component having a first portion defining a first width and a second portion defining a second width larger than the first width with the first portion contained within the first cavity and the second portion contained within the second cavity, and with the resilient flange directly engaging the second portion of the abdomen component to resiliently retain the abdomen component to the base member.

In this arrangement, the resilient flange aids in minimizing or preventing separation issues between the abdomen component and the base member that may occur during collision testing. Accordingly, the coupled abdomen component, resilient flange and base member provide a more human-like response during collision testing as compared with anthropomorphic test devices including the coupled abdomen component and base member in the absence of the resilient flange and having these separation issues. In addition, the coupling design also aids in initially positioning and maintaining the position of the coupled abdomen component relative to the base member prior to collision testing.

Other features and advantages of the present disclosure will be readily appreciated, as the same becomes better understood, after reading the subsequent description taken in conjunction with the accompanying drawings.

DESCRIPTION OF THE PREFERRED EMBODIMENT(S)

Figure 1:
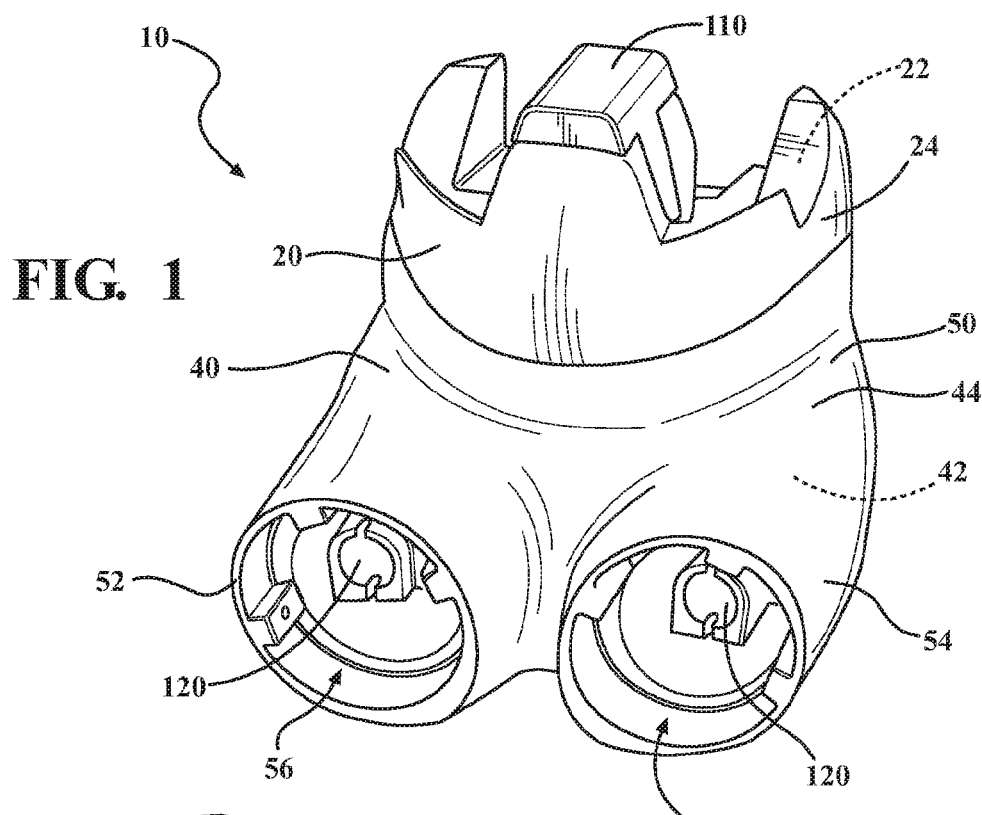
FIG. 1 is a perspective view of one embodiment of a portion of an anthropomorphic test device in accordance with the present disclosure including an abdomen component coupled to a base member and including a resilient flange coupled to the base member.
Figure 2:
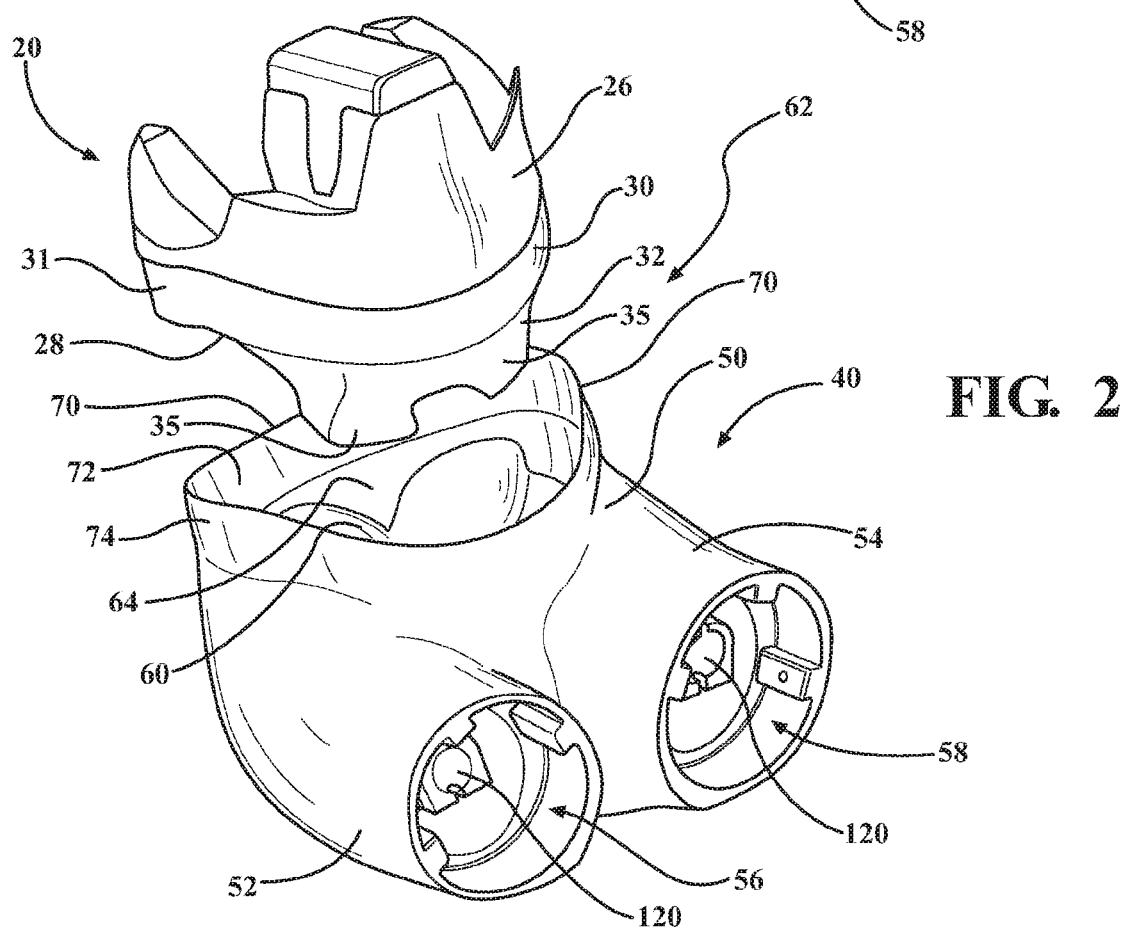
FIG. 2 is a front perspective view of the abdomen component uncoupled from the base member of FIG. 1.
Figure 3:
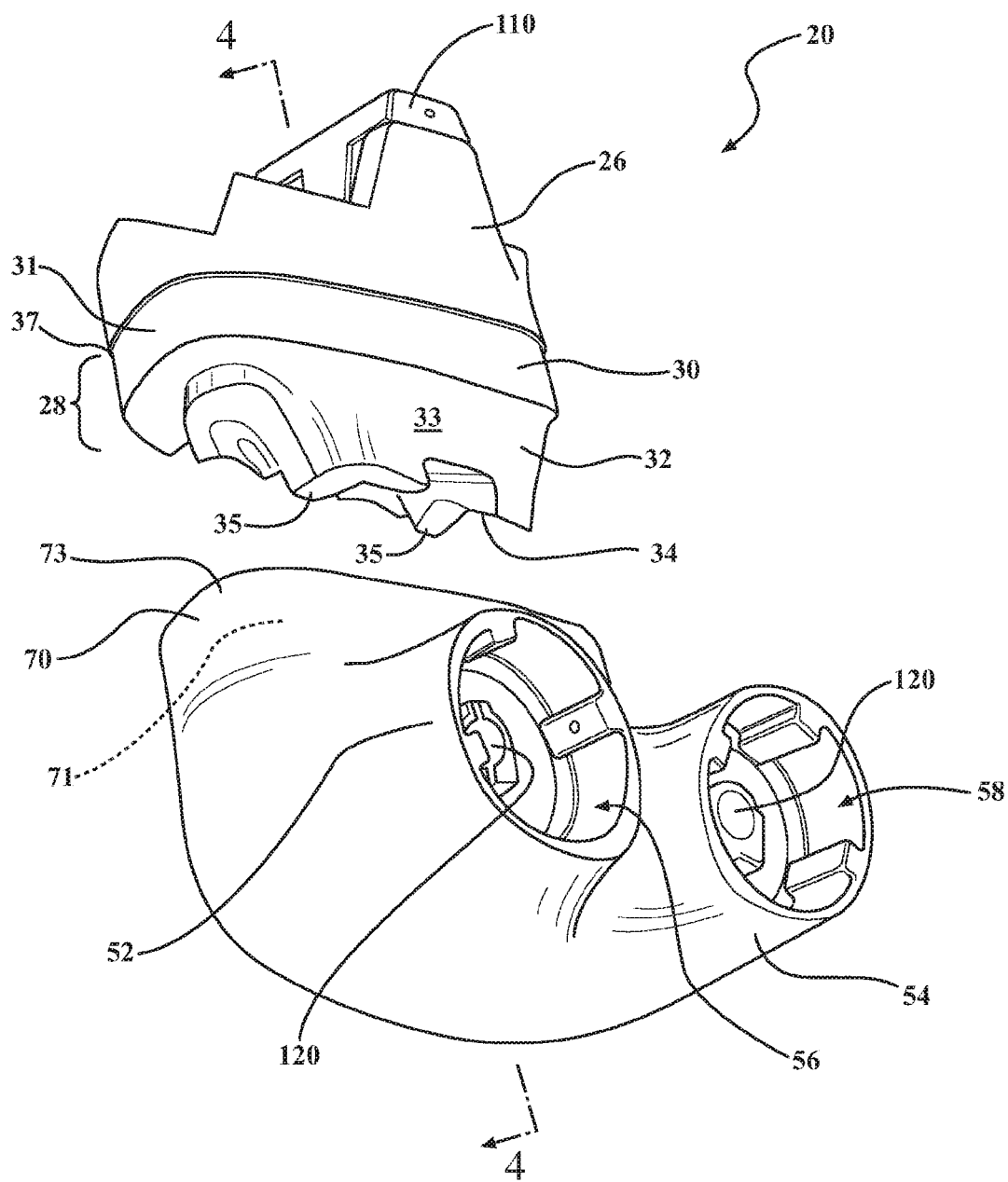
FIG. 3 is a rotated perspective view of FIG. 2.

Referring to FIGS. 1-7, embodiments of a portion of an anthropomorphic test device, or crash test dummy, is generally indicated at 10 and includes an abdomen component 20 coupled to a base member 40. The embodiments also include a resilient flange 70 that is coupled to and extends from the base member 40. The abdomen component 20, base member 40 and resilient flange 70 are positioned on the crash test dummy 10 in the embodiments herein in a position generally corresponding to the abdominal and pelvic region of the crash test dummy 10. In certain embodiments, the base member 40 may alternatively be referred to as a pelvis member.

The terms "anthropomorphic test device" or "crash test dummy" are used interchangeably in the present disclosure. The crash test dummy 10 is of a fiftieth percentile (50%) male type and is illustrated in a sitting position. This crash test dummy 10 is used primarily to test the performance of automotive interiors and restraint systems for adult front and rear seat occupants. The size and weight of the crash test dummy 10 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

The embodiments of the abdomen component 20 and base member 40, and the resilient flange 70 as described below and as noted above, are directed primarily to their use in the abdominal and pelvic region of a crash test dummy 10. However, the principles and coupling of these components can used to couple together any two flesh components at various other locations in the crash test dummy 10 and are not limited therefore exclusively for use in the abdomen and pelvic region. However, for ease of description hereinafter, the description hereinafter will refer to the use of these components in the abdomen and pelvic region of a crash test dummy 10.

The abdomen component 20 includes an inner core foam portion 22 covered with a skin 24. The abdomen component 20 is hollow to allow for the inclusion of support structure 110 to provide structural integrity to the crash test dummy 10 and to more closely simulate the structure and function of the abdominal region of a human (i.e., provide a more human-like response of the abdominal region in collision testing).

The abdomen component 20 includes an upper portion 26 that is configured to be positioned between beneath a rib cage assembly (not shown) and a lower portion 28 that is configured to be received within the base member 40.

The lower portion 28 of the abdomen component 20 includes a first portion 32 and a second portion 30. The second portion 30, here shown as an upper band region 30, is positioned adjacent to and extends away from the upper portion 26 towards the first portion 30. The outer surface 31 of the second portion 32 has a length L1 (i.e., a height L1) defined between the first portion 32 and the upper portion 26. An edge defining a notch 37 extends transversely to and connects the second portion 30 to the upper portion 26.

The first portion 32 extends from the second portion 30 in a direction opposite the upper portion 26 and terminates into a bottom region 34. The outer surface 33 of the first portion 32 extends inwardly relative to the outer surface 31 of the second portion 31 and terminates into a bottom region 34. The bottom region 34 may include one or more projection regions 35.

Figure 4:
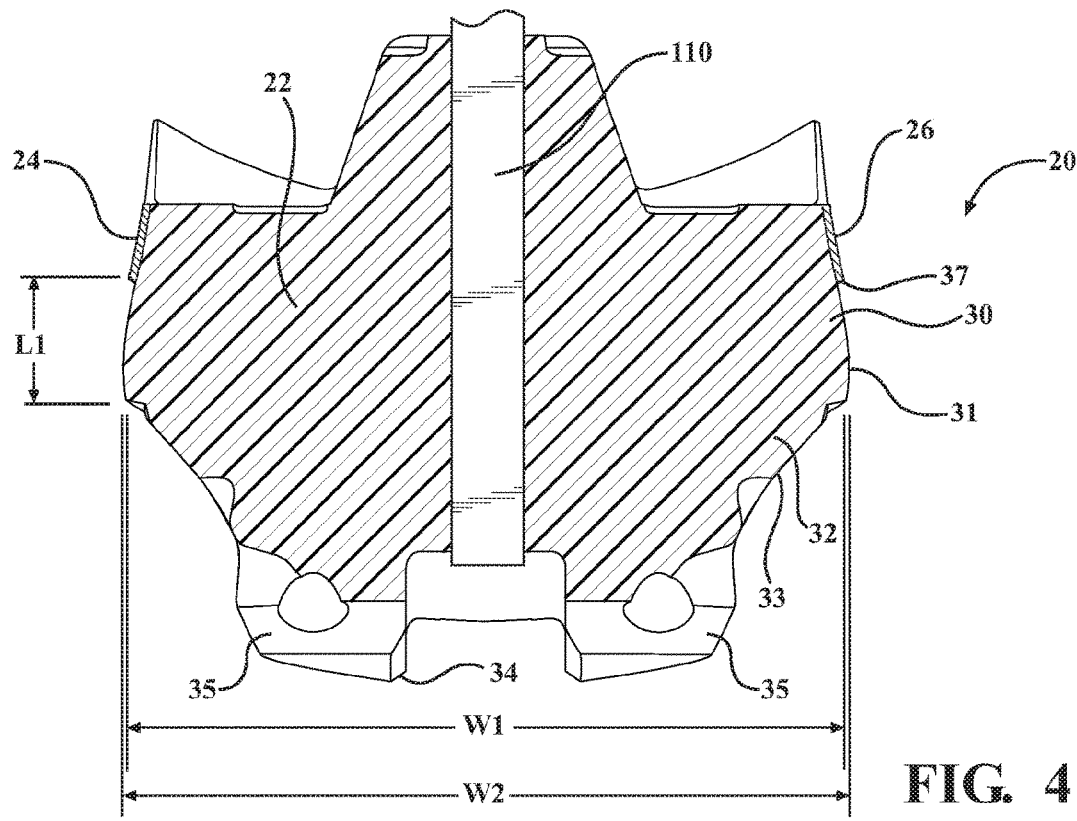
FIG. 4 is a sectional view of FIG. 3 taken along line 4-4.

As best shown in FIG. 4, the maximum width W1 of the first portion 32 of the abdomen component 20 is less than the maximum width W2 of the second portion 30.

The maximum width W1 of the first portion 32 refers to a distance measurement between the outer surfaces 33 of the first portion 32 of the abdomen component 20, while the maximum width W2 of the second portion 30 refers to a distance measurement between the outer surfaces 31 of the second portion 32 of the abdomen component 20 along any one cross-sectional view of the abdomen member, which the line defining each of the respective widths w1 and w2 being parallel to one another. It can be appreciated that by changing the plane of the cross-sectional view of the abdomen component, additional maximum widths W1 and W2 can be obtained. If enough different cross-sectional views of the abdomen component are obtained, the plurality of obtained maximum widths W1 and W2 can define a respective circumference for each of the first portion 32 and second portion 30 of the abdomen component 20. Notably, because the maximum width w1 of the first portion 32 of the abdomen component 20 is less than the maximum width W2 of the second portion 30, the corresponding circumference of the first portion 32 of the abdomen component 20 is also less than the corresponding circumference of the second portion 30.

The base member 40, like the abdomen component 20, includes an inner core foam portion 42 covered with a skin 44. The skin 44 may envelop the inner foam portion 42, and thus defines a foam-containing cavity portion 45 that contains the inner foam portion 42. The base member 40 is open and includes a base inner surface 60 defining an opening 62 and defining an inner cavity 64, or first cavity 64, with the inner surface 60 contoured to correspond to the shape of the first portion 32 of the abdomen component 20. The base inner surface 62 near the bottom of the first cavity 64 thus includes one or more surface depressions 65, with each of the one or more surface depressions 65 configured to receive a corresponding one of the one or more projection regions 35 when the abdomen component 20 is received within the first cavity 64, as will be described further below.

The first cavity 64 allows for the inclusion of a support structure 111, here shown as pelvis support structure, that is intended to simulate the lower portion of a human spine. The support structure 111 also functions to provide structural integrity to the crash test dummy 10 and to more closely simulate the structure and function of the pelvic region of a human (i.e., provide a more human-like response of the pelvic region in collision testing). The support structure 111, in certain instances, may be coupled to a further support structure 120, shown in FIGS. 1-3 as pair of upper thigh support structures 120.

The base member 40, when used as a pelvis member, includes a pelvic region 50 and a pair of upper thigh regions 52, 54 extending from the pelvic region 50. The upper thigh regions 52, 54 include openings 56, 58 configured to receive additional members associated with the legs of the crash test dummy 10, including the lower thigh members (not shown), and accommodates the additional structural members 120 extending from the structural member 111 included in the base member 40 as described above.

Figure 6:
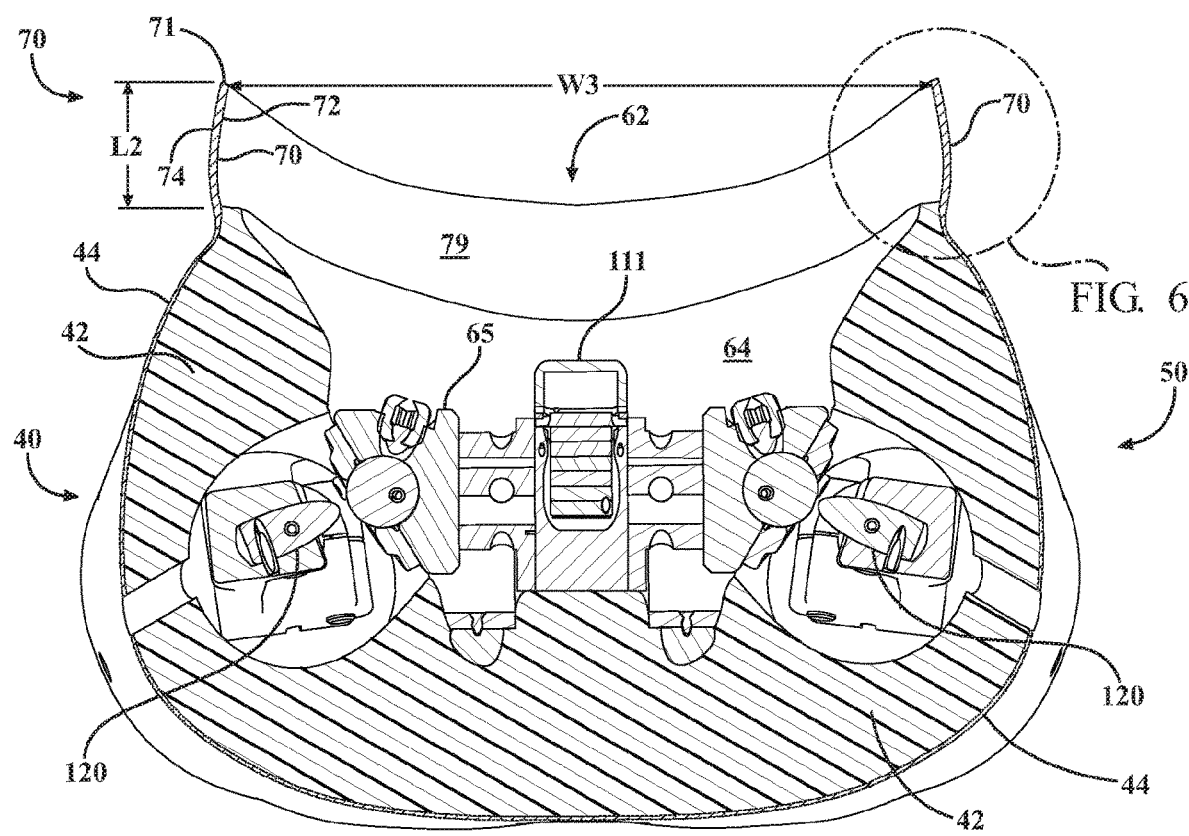
FIG. 6 is a close-up view of a portion of FIG. 4 according to one embodiment.
Figure 7:
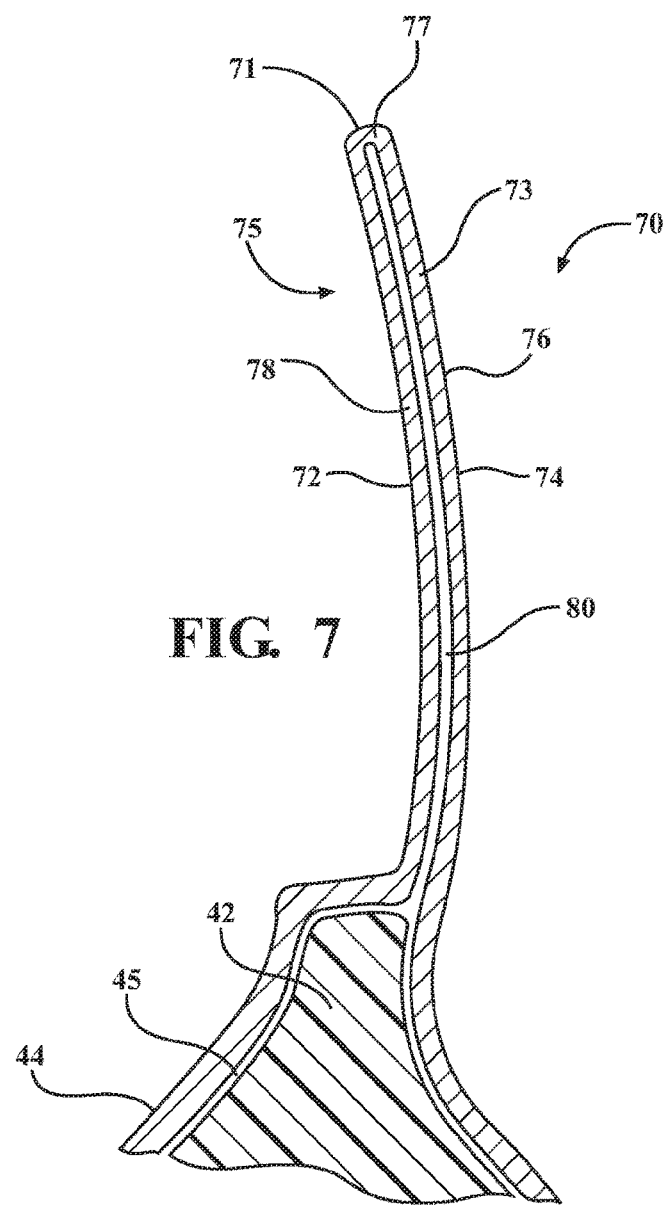
FIG. 7 is a close-up view of a portion of FIG. 4 according to another embodiment.

The crash test dummy 10 also includes a resilient flange 70 which is coupled to the base member 40. As best shown in FIGS. 4, 6 and 7, the resilient flange 70 includes a flange inner surface 72 and an opposing flange outer surface 74, with a peripheral edge 71 of the resilient flange 70 opposite the base member 40 connecting the flange inner and outer surface 72, 74, with the flange inner surface 72 further defining the opening 62 and additionally defining a second cavity 79. The second cavity 79 is in open communication with the first cavity 64 of the base member 40. The flange inner surface 72 is sized and shaped to generally correspond to the size and shape of the outer surface 31 of the upper band region 30 of the abdomen component 20. The thickness of the resilient flange 70, as measured between the flange inner surface 72 and the flange outer surface 74 (i.e., the length of the peripheral edge 71), is thin, ranging generally from 3 to 10 millimeters, and more preferably from 3 to 5 millimeters, to provide the resilient flange 70 with flexibility such that it can resiliently be retained against the second portion 30 of the abdomen component 20, as will be described further below. Preferably, the thickness of the resilient flange 70 corresponds to the transverse length of the notch 37.

As also best shown in FIG. 4, the resilient flange 70 also can be defined by a maximum width W3. The maximum width W3 of the resilient flange 70, and preferably the flange inner surface 72, is defined prior to the second portion 30 of the abdomen component 20 being contained within the second cavity 79 and thus represents the maximum width of the flange inner surface 72 in the natural, or unstretched state. As shown, herein, the maximum width W3 of the resilient flange 70 is less than the maximum width W2 of the second portion 30 of the abdomen member 20 but is greater than the maximum width W1 of the first portion 32 of the abdomen member 20.

In certain embodiments, the resilient flange 70 is integrally formed with the base member 40, while in alternative embodiments the resilient flange 70 is a separate structure that is coupled to, or otherwise secured or affixed to, the base member 40. Like the abdomen component 20 and base member 40, the resilient flange 70 includes a skin 73. However, unlike the abdomen component 20 and base member 40, the resilient flange 70 does not include an inner foam core contained within the skin 73. The skin 73 may be formed from a single material or combination of materials that has the desired flexibility and/or elasticity and strength to perform its desired function, as described further below.

In certain embodiments, as best shown in FIG. 6, the resilient flange 70 extends from, or is otherwise integrally formed with the skin 44 of the base member 40 and has a length L2 terminating at the peripheral edge 71. Accordingly, in these embodiments, the skin 73 may be an extension (i.e., is integrally formed with) of the skin 44 of the base member 40 while in alternative embodiments the skin 73 is coupled to, affixed, or otherwise secured to and thus extends from the skin 44.

Preferably, the length L2 of the resilient flange 70, from the base member 40 to the peripheral edge 71, is substantially like, or the same as, as the length L1 of the second portion 30 of the abdomen component 20. Further, the thickness of the skin 73 of the resilient flange 70, as shown in FIG. 6., may be the same or different as to the thickness of the skin 44, and may range from 3 to 10 millimeters, and more preferably ranges from 3 to 5 millimeters.

In certain alternative embodiments, such as shown in FIG. 7, the skin 73 of the resilient flange 70 defines a looped structure 75, with the looped structure 75 including an outer loop portion 76 and an inner loop portion 78 and a transitional loop portion 77 connecting the outer and inner looped portions 76, 78, and with each of said outer and inner looped portions 76, 78 separately coupled to and extending from the skin 44 of the base member 40. As in FIG. 6, the thickness of the skin 73 corresponding to the outer loop portion 76, the inner looped portion 78 and the transitional loop portion 77 preferably ranges from 1.5 to 10 millimeters, such as from 3 to 5 millimeters. The thickness of the looped structure 75, which includes the combined thickness of the outer loop portion 76 and the inner looped portion 78, thus preferably ranges from 3 to 20 millimeters, and more preferably from 3 to 5 millimeters. Preferably, the thickness of the looped structure corresponds to the transverse length of the notch 37, or alternatively corresponds to the length of the peripheral edge 71.

The looped structure 75 also defines a loop cavity 80 that within the outer loop portion 76, the inner looped portion 78 and the transitional loop portion 77. The loop cavity 80 is in open communication with the foam-containing cavity 45 but does not include any of the inner foam core 42 (i.e., the inner foam core 42 is entirely contained within the foam-containing cavity 45).

Figure 5:
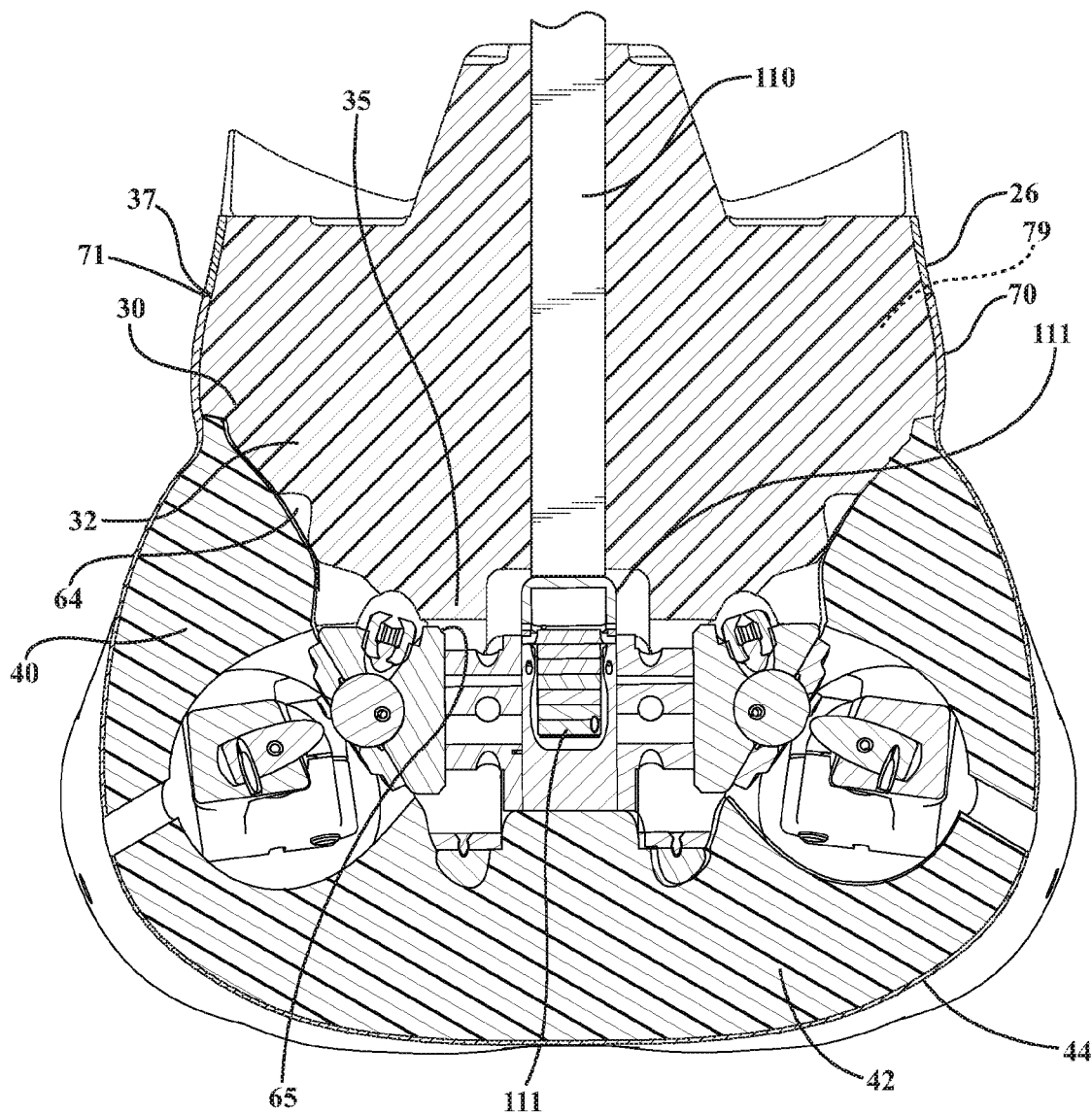
FIG. 5 a coupled view of the abdomen component and base member of FIG. 4, corresponding to a sectional view of FIG. 1.
Figure 6:
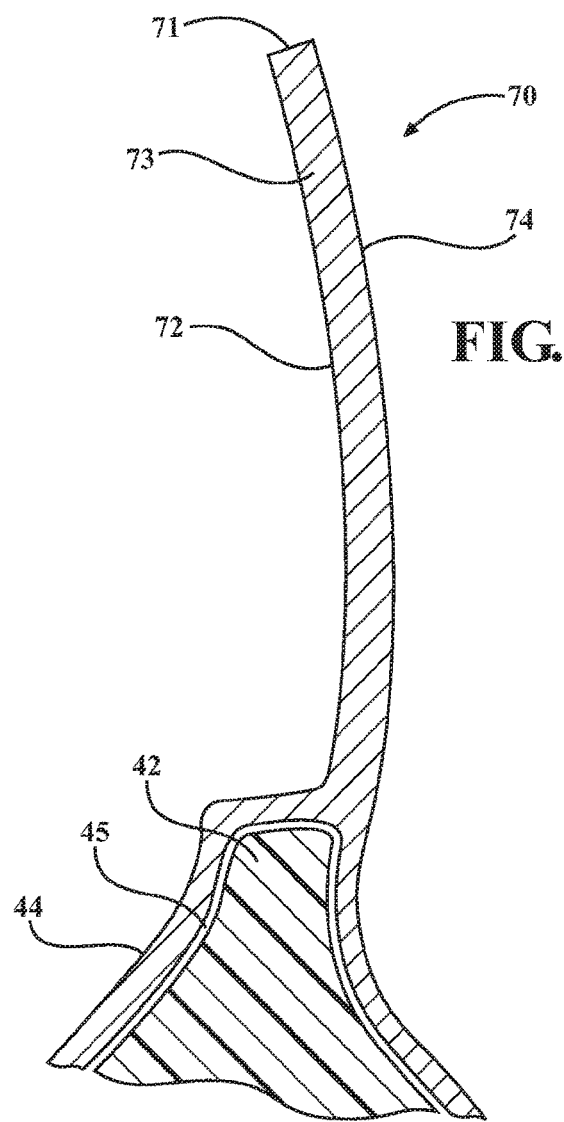

When the abdomen component 20 is coupled to the base member 40, as shown in FIGS. 1 and 5, the second portion 32 of the abdomen component 20 is inserted within the opening 62 such that the abdomen component 20 is partially contained within the first cavity 64 and the second cavity 79 such that the outer surface 33 of the first portion 32 of the abdomen component 20 is engaged with the base inner surface 62. In addition, the outer surface 31 of the second portion 30 of the abdomen component 20 is directly engaged and is resiliently retained by the resilient flange 70. Further, the peripheral edge 71 of the resilient flange 70 abuts the notch 37, and thus the flange outer surface 74 transitions smoothly into the outer surface of the upper portion 26.

Still further, each respective one of the projection regions 35 is seated within a corresponding one of the one or more surface depressions 65. Even still further, the structural component 110 disposed within the abdomen component is coupled to the structural component 111 contained in the first cavity 64 of the base member 40.

As the abdomen component 20 is being coupled to the base member 40, the first portion 32 of the abdomen component freely extends through the opening 62 and second cavity 79 and into the first cavity 64 because the maximum width W1 of the first portion 32 is less than the maximum width W3 of the resilient flange 70. As the abdomen component 20 moves closer to the one or more surface depressions 65, the second portion 30 of the abdomen component 20 contacts the flange inner surface 72 and begins to apply force to the flange inner surface 72 to stretch the skin 73 in a direction outwardly from the second cavity 79 and towards the flange outer surface 74. This application of force increases the width of the resilient flange 70 beyond its maximum width W3 to a width slightly greater than the maximum width W2 of the second portion 30 of the abdomen component 20, thus allowing the second portion 30 of the abdomen component to be fully received in the second cavity 79 with the outer surface 31 of the second portion 30 of the abdomen component 20 positioned into direct engagement with the flange inner surface 72. Once the abdomen component is fully seated such that the one of the projection regions 35 are seated within a corresponding one of the one or more surface depressions 65 and such that the peripheral edge 71 abuts the notch 37, the resiliency of the skin 73 retains the flange inner surface 72 of the resilient flange in direct engagement with the outer surface 31 of the second portion 30. This direct engagement is sufficiently strong to retain the base member 40 in the coupled state with the abdomen component 20.

In this arrangement, the resilient flange 70 aids in initially positioning and maintaining the positioning of the abdomen component 20, preferably by being resiliently retained against the outer surface 31 of the second portion 30, within the cavity 64 of the base member 40 prior to any collision testing. In addition, the resilient flange 70 aids in minimizing or preventing separation issues between the abdomen component 20 and the base member 40 that may occur during collision testing by virtue of its resilient retention features, as compared with arrangements wherein the resilient flange 70 is not present.

The present disclosure also describes a system 1000 for creating a virtual anthropomorphic test device and evaluating the created virtual anthropomorphic test device in a virtual crash test using a software application included on a computer 1030. The anthropomorphic test device is a virtual representation of the anthropomorphic test device 10 described above, including all of the features and components as described above.

Figure 8:
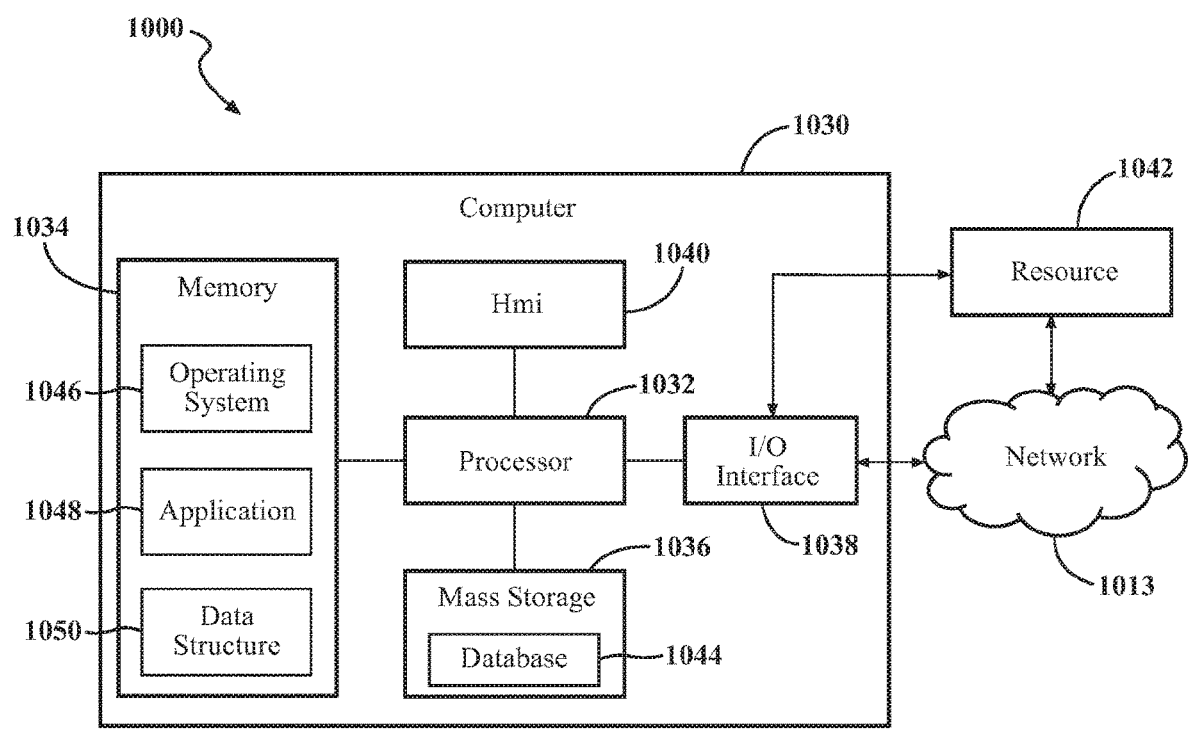
FIG. 8 is a schematic view of a system for creating and evaluating a virtual anthropomorphic test device.

Referring now to FIG. 8, the computer 1030 may include at least one processor 1032, a memory 1034, a mass storage memory device 1036, an input/output (I/O) interface 1038, and a Human Machine Interface (HMI) 1040. The computer 1030 may also be operatively coupled to one or more external resources 1042 via the network 1013 and/or I/O interface 1038. External resources may include, but are not limited to, servers, databases, mass storage devices, peripheral devices, cloud-based network services, or any other suitable computing resource that may be used by the computer 1030.

The processor 1032 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 1044 may reside on the mass storage memory device 1036, and may be used to collect and organize data used by the various systems and modules described herein.

Processor 1032 may operate under the control of an operating system 1046 that resides in memory 1034. The operating system 1046 may manage computing resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1050 may also reside in memory 1034, and may be used by the processor 1032, operating system 1046, and/or application 1048 to store or manipulate data. The software application 1048, as provided herein, includes software applications that create the virtual anthropomorphic test device 10' and software applications that evaluate the created virtual anthropomorphic test device 10' in a virtual crash test setting.

The I/O interface 1038 may provide a machine interface that operatively couples the processor 1032 to other devices and systems, such as the network 1013 and/or external resource 1042. The application 1048 may thereby work cooperatively with the network 1013 and/or external resource 1042 by communicating via the I/O interface 1038 to provide the various features, functions, applications, processes, and/or modules comprising embodiments of the invention. The application 1048 may also have program code that is executed by one or more external resources 1042, or otherwise rely on functions and/or signals provided by other system or network components external to the computer 1030. Indeed, given the nearly endless hardware and software configurations possible, persons having ordinary skill in the art will understand that embodiments of the invention may include applications that are located externally to the computer 1030, distributed among multiple computers or other external resources 1042, or provided by computing resources (hardware and software) that are provided as a service over the network 1013, such as a cloud computing service.

The HMI 1040 may be operatively coupled to the processor 1032 of computer 1030 in a known manner to allow a user of the computer 1030 to interact directly with the computer 1030. The HMI 1040 may include video and/or alphanumeric displays, a touch screen, a speaker, and any other suitable audio and visual indicators capable of providing information to the user. The HMI 1040 may also include input devices and controls such as an alphanumeric keyboard, a pointing device, keypads, pushbuttons, control knobs, microphones, etc., capable of accepting commands or input from the user and transmitting the entered input to the processor 1032.

The present disclosure addresses and overcomes the separation issues associated with prior art abdomen flesh coupling designs and provides therefore a crash test dummy 10 with the new flesh coupling design having a more human-like response, particularly with respect to the abdomen region, during collision testing. The associated system allows virtual crash test simulations to be run to confirm that the crash test dummies 10 disclosed herein addresses and overcomes the separation issues.

The present disclosure has been described in an illustrative manner. It is to be understood that the terminology, which has been used, is intended to be in the nature of words of description rather than of limitation.

Many modifications and variations of the present disclosure are possible in light of the above teachings. Therefore, the present disclosure may be practiced other than as specifically described.

What is claimed is:

1. An anthropomorphic test device comprising:
    a base member having a base inner surface and an opposing base outer surface with said base inner surface defining a first cavity;
    a resilient flange coupled to and extending from said base member with said resilient flange having a flange inner surface, an opposing flange outer surface and a flange peripheral edge with said flange defining a second cavity and with said second cavity extending from and open to said first cavity; and
    an abdomen component having a first portion defining a first width and a second portion defining a second width larger than said first width with said first portion contained within said first cavity and said second portion contained within said second cavity, and with said resilient flange directly engaging said second portion of said abdomen component to resiliently retain said abdomen component to said base member.

2. The anthropomorphic test device of claim 1, wherein a maximum width of said flange, defined prior to said second portion of said abdomen component being contained within said second cavity, is less than said second width.

3. The anthropomorphic test device of claim 1, wherein a maximum width of said flange is greater than said first width.

4. The anthropomorphic test device of claim 1, wherein said peripheral edge of said resilient flange defines an opening, and wherein said abdomen component is at least partially received through said opening and into said first and second cavity when said abdomen component is coupled to said base member and said resilient flange.

5. The anthropomorphic test device of claim 1, wherein said abdomen component is hollow and defines an internal cavity, and wherein said abdomen component includes a first support member disposed within said internal cavity.

6. The anthropomorphic test device of claim 5, wherein said base member includes a second support member disposed within said first cavity, and wherein said second support member is disposed adjacent to said first support member when said abdomen component is coupled to said base member.

7. The anthropomorphic test device of claim 1, wherein said base member comprises an inner foam core covered with a first skin, and wherein said resilient flange comprises a second skin, and wherein said second skin is coupled to and extends from said first skin.

8. The anthropomorphic test device of claim 7, wherein said second skin is integrally formed with and extends from said first skin.

9. The anthropomorphic test device of claim 7, wherein a thickness of said second skin ranges from 3 to 5 millimeters.

10. The anthropomorphic test device of claim 7, wherein said second skin defines a looped structure with said looped structure including an outer loop portion and an inner looped portion and a transitional loop portion connecting said outer and inner looped portions, and with each of said outer and inner looped portions separately coupled to and extending from said first skin.

11. The anthropomorphic test device of claim 10, wherein said second skin defines a loop cavity within said looped structure, and wherein said first skin defines a foam-containing cavity in open communication with said loop cavity, and wherein said inner foam core is entirely contained within said foam-containing cavity.

12. The anthropomorphic test device of claim 1, wherein a length of said resilient flange extending from said base member is equal to a corresponding height of said second portion extending from said first portion.

13. The anthropomorphic test device of claim 1, wherein a bottom of said first portion of said abdomen component includes one or more projection regions, and wherein said base inner surface defines one or more surface depressions, and wherein one of said one or more projection regions is seated within a corresponding one of said one or more surface depressions when said abdomen component is coupled to said base member.

14. The anthropomorphic test device of claim 1, wherein said abdomen component further includes a transversely extending notch connecting an upper portion of said abdomen component to said second portion, and wherein said flange peripheral edge abuts said notch when said abdomen component is coupled to said base member and said resilient flange.

15. A method of forming a portion of an anthropomorphic test device including a base member having a base inner surface defining a first cavity and an abdomen component having a first portion defining a first width and a second portion defining a second width larger than the first width, said method comprising:
coupling a resilient flange to said base member, the resilient flange having a flange inner surface, an opposing flange outer surface, and a flange peripheral edge surface with the flange defining a second cavity and with the second cavity extending from and open with the first cavity; and
coupling the abdomen component to the base member and the resilient flange such that the abdomen component is partially contained within the first and second cavity and such that an outer surface of the first portion of the abdomen component is engaged with the base inner surface and such that an outer surface of the second portion of the abdomen component is resiliently retained by the resilient flange.

16. The method of claim 15, wherein an at-rest maximum width of the flange is less than the second width and wherein the at-rest maximum width of the flange is greater than the first width, and wherein said step of coupling the abdomen component to the base member and the resilient flange further comprises:
applying force from the second portion of the abdomen component to the flange in a direction towards the flange outer surface during the step of coupling the abdomen component to the base member and the resilient flange to increase the width of the flange to a value greater than the at-rest maximum width and greater than the second width.

17. The method of claim 15, wherein the abdomen component is hollow and defines an internal cavity, and wherein said method further comprises the steps of:
disposing a first support member within said internal cavity;
disposing a second support member within said first cavity; and
disposing the second support member adjacent to the first support member when the abdomen component is coupled to the base member.

18. The method of claim 15, wherein a bottom of the first portion of said abdomen component includes one or more projection regions, and wherein the base inner surface defines one or more surface depressions, and wherein one of the one or more projection regions is seated within a corresponding one of said one or more surface depressions during said step of coupling the abdomen component to the base member and the resilient flange.

* * * * *